Figure 1:
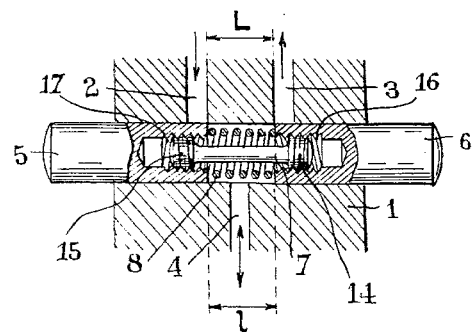

United States Patent Office 3,240,231
Patented Mar. 15, 1966

3,240,231
THREE-WAY VALVES WITH ADJUSTABLE OVERLAP
Jean Cadiou, Paris, France, assignor to Societe Anonyme Andre Citroen, Paris, France
Filed Sept. 7, 1962, Ser. No. 222,046
Claims priority, application France, Sept. 7, 1961, 872,581, Patent 1,308,618
3 Claims. (Cl. 137—625.27)

This invention relates to a three-way valve comprising a body in which two feed ducts are formed which communicate with the source of compressed fluid and the exhaust of a hydraulic circuit respectively, a load duct being also formed in said body and communicating with a member to be actuated hydraulically, and a slide valve member movable in a longitudinal bore formed in said body between an intermediate position in which said load duct is isolated and two end positions in which said load duct communicates with said source or with said exhaust, respectively.

In a prior U.S. Patent No. 3,049,149 issued August 14, 1962, there is described a valve of this general type wherein the slide valve recess which, as a consequence of the sliding movement of the slide valve member in the valve body, is adapted to uncover the compressed fluid inlet and exhaust ports, as well as these ports themselves, are so shaped that the difference between the gap available between the inlet and exhaust ports and the gap formed by the edges of the slide valve recess lying between said two ports has a value varying as a function of the angular setting of this slide valve member in said valve body, the angular setting of this slide valve member thus affording any desired adjustment of this difference constituting the valve overlap.

In the aforesaid patent, it is stated that the three-way valve may also be as well of the open centre type wherein the load duct communicates permanently simultaneously with the inlet and exhaust ports, as a closed-centre valve wherein the load port can only communicate with one of the inlet and exhaust ports in slide valve positions departing on either side of the so-called overlap gap in which the load port is closed completely by said slide valve member.

Of course, with the arrangement described and illustrated in this prior patent application it is possible to construct a valve exactly of the intermediate type, that is, a valve with zero overlap, in which the complete closing of the load port occurs only in a single accurately determined intermediate position of the slide valve member. This specific type of valve is advantageous in that it combines the progressiveness of open-centre valves with the economical operation characterizing closed-centre valves. These three-way, zero-overlap valves are therefore particularly useful in many applications.

However, when the three-way valve of the aforesaid patent application with positive, negative or zero adjustable overlap is used in high-pressure systems, this overlap is not strictly accurate, due to the play occurring in the bores formed in the valve body and also to the fact that the edges of the slide valve recess and of the ports leading to or from the three ducts in said body lack sharpness. This drawback plays a minor part when the construction of an open or closed centre valve is contemplated, but on the other hand it makes definitely impossible the construction of a three-way valve with strictly zero overlap which is particularly useful in many systems.

It is the object of the present invention to provide a three-way valve of the general type set forth hereinabove, which is remarkable notably in that it permits a particularly accurate adjustment of the degree of overlap and more particularly in that it can be dimensioned to constitute a valve with strictly zero overlap.

In this valve the slide valve member proper consists of two half slide valve sections inserted in the longitudinal bore on either side of the body, the registering edges of said slide valve sections forming therebetween the intermediate recess of the slide valve, the slide valve member also comprising an adjustable coupling between these two slide valve sections whereby the relative spacing of said registering edges may be adjusted at will.

Figure 2:
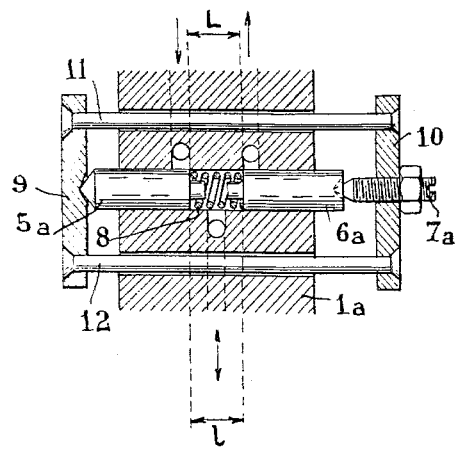

The features and advantages characterizing this invention will appear more clearly as the following description proceeds with reference to the attached drawing illustrating diagrammatically typical embodiments of the invention. In the drawing:

FIGURE 1 is a fragmentary axial section showing a first embodiment of a three-way valve constructed according to the teachings of this invention, the section being taken in the plane of the three ducts leading to and from the valve bore; and FIGURE 2 is a view similar to FIG. 1 but showing an alternate embodiment of the valve of this invention.

The valve body 1 has formed therethrough, like conventional three-way valves, a longitudinal bore and transverse feed ducts 2, 3 leading therein, one duct 2 communicating with a source of compressed fluid and the other 3 with an exhaust; another transverse duct 4 leads from this bore and communicates with a member to be actuated hydraulically. A composite slide valve member consists of two half slide members 5, 6 having their registering ends tapped and coupled together by a coupling member 7 having the screw-threaded ends 14, 15 engaging said tapped ends 16, 17. A relatively strong compression coil spring 8 surrounds said coupling member 7 and bears with its end convolutions against said registering faces of the slide valve sections 5, 6. This composite slide valve member is slidably fitted, as in conventional constructions, in the longitudinal bore of valve 1 and responsive to means for actuating it in the axial direction, said means engaging for example one end of a section 5 or 6 which projects from the valve body. The number of threads of said screw-threaded ends of the coupling member 7 is reduced to a minimum and the play between these threads and the tapped holes in the two slide valve halves 5, 6 is sufficient to prevent said threads from exerting any radial stress within said tapped holes and therefore inducing any deformation of the cylindrical outer surface of said composite slide valve member. The spring 8 takes up completely any axial or longitudinal play and therefore ensures a precise setting of the relative spacing of the registering faces of said sections 5 and 6 of said slide valve member. Thus, by screwing more or less the two slide valve sections 5, 6 this gap $l$ can be set at the desired value. If L is the space measured between the adjacent edges of the ports of ducts 2, 3 leading into and from the bore in the valve body 1, the overlap L—$l$ of the valve can be adjusted at will.

More particularly, and as illustrated diagrammatically in the drawing, the valve may be constructed as a zero-overlap valve, and in this case the relative adjustment of the two slide valve sections 5, 6 will be such as to ensure a strict equality between the two distances L and $l$.

In the alternate embodiment illustrated in FIG. 2 of the drawing the two side valve sections 5a and 6a carry on their registering end faces two studs or pins for centering the coil spring 8, as shown. These sections 5a and 6a are mounted in a frame consisting of a pair of cross members 9, 10 braced by rods 11, 12 which may extend and slide through the body 1a. The end of one of the two slide valve sections, for example of slide valve sections 6a, engages the corresponding cross member 10 through the medium of an adjustment screw 7a.

Although the above description and attached drawing refer only to two forms of embodiment of the invention, it is within the skill of anybody conversant with the art to bring various modifications and alterations to these forms of embodiment without departing from the spirit and scope of the invention as set forth in the appended cliams.

What I claim is:

1. A valve comprising a body through which a cylindrical cavity is formed together with a compressed-fluid inlet duct and an exhaust duct, said inlet and exhaust ducts leading into said cylindrical cavity respectively through a pair of ports separated by an interval, a load duct opening into said cylindrical cavity through a port disposed within said interval between said ports of said inlet and exhaust ducts, a pair of cylindrical valve members slidably mounted in said cylindrical cavity of said body, each of said cylindrical valve members having an external end projecting externally of said body and an internal end housed in said body, the two internal ends of said pair of cylindrical valve members facing each other in said cylindrical cavity of said body and being spaced apart so as to bound therein a gap comprising said load duct port, a compression spring mounted in said cylindrical cavity of said body within said gap and pressing on the internal ends of said valve members to tend to increase said gap, a pair of rods slidably extending through said body and parallel to said cylindrical valve members and having end portions projecting from said body, a pair of cross members secured on said end portions of said rods, one of said cross members being shaped to constitute a bearing engageable by the external end of one of said cylindrical valve members, and an adjustable setting screw extending through the other of said cross members and having an end shaped to act as a bearing for the external end of said other cylindrical valve member.

2. A valve comprising a body through which a cylindrical cavity is formed together with a compressed-fluid inlet duct and an exhaust duct, said inlet and exhaust ducts leading into said cylindrical cavity respectively through a pair of ports separated by an interval, a load duct opening into said cylindrical cavity through a port disposed within said interval between said ports of said inlet and exhaust ducts, a pair of cylindrical valve members slidably mounted in said cylindrical cavity of said body, each of said cylindrical valve members having an external end projecting externally of said body and an internal end housed in said body, the two internal ends of said pair of cylindrical valve members facing each other in said cylindrical cavity of said body and being spaced apart so as to bound therein a gap comprising said load duct port, a compression spring mounted in said cylindrical cavity of said body within said gap and pressing on the internal ends of said valve member to tend to increase said gap, adjustable setting means having an articulated connection to each of said valve members and acting on said cylindrical valve members solely in an axial direction variably to limit the increase of said gap by said spring without restraining said valve members radially said setting means being movable axially with said valve members and being actuatable externally of said body to vary the limitation of said gap by said limiting means.

3. A valve according to claim 2, in which said valve members are provided in their internal ends with tapped axial holes, and in which said adjustable setting means comprises a coupling member having threaded opposite ends lossely screwed into said tapped holes to provide an articulated connection of said coupling member with said valve members, the gap between said valve members being variable by rotating said valve members relative to one another to screw said threaded ends of said coupling member further inwardly or outwardly in said holes.

References Cited by the Examiner

UNITED STATES PATENTS

| 901,141 | 10/1908 | Baker | 137—625.69 |
| 1,910,909 | 5/1933 | Werder | 251—278 X |
| 2,679,829 | 6/1954 | Gorrie et al. | 137—488 X |
| 3,049,149 | 8/1962 | Brueder | 137—625.17 |
| 3,163,175 | 12/1964 | Pearson | 137—625.37 X |

FOREIGN PATENTS 531,019   10/1921   France.

M. CARY NELSON, *Primary Examiner.*

MILTON KAUFMAN, *Examiner.*

A. ROSENTHAL, *Assistant Examiner.*